United States Patent [19]

Yoshino

[11] Patent Number: 4,481,788
[45] Date of Patent: Nov. 13, 1984

[54] WATER HEATING SYSTEM

[75] Inventor: Hozo Yoshino, Tokyo, Japan

[73] Assignees: System Homes Company, Ltd.; Mitsubishi Denki Kabushiki Kaisha, both of Tokyo, Japan

[21] Appl. No.: 448,045

[22] Filed: Dec. 8, 1982

[30] Foreign Application Priority Data

Dec. 9, 1981 [JP] Japan ............... 56-197003

[51] Int. Cl.³ .............................. F25D 17/00
[52] U.S. Cl. .................... 62/181; 62/238.6; 62/190; 62/178; 236/91 C; 237/2 B
[58] Field of Search ............... 62/178, 177, 180, 181, 62/238.6, 235.1, 506, 176 B, 190; 126/427; 236/91 C; 237/2 B

[56] References Cited

U.S. PATENT DOCUMENTS

| | | | |
|---|---|---|---|
| 4,152,902 | 5/1979 | Lush | 62/175 X |
| 4,269,261 | 5/1981 | Kountz et al. | 237/2 B X |
| 4,384,462 | 5/1983 | Overman et al. | 62/17 S |

Primary Examiner—Albert J. Makay
Assistant Examiner—Henry Bennett
Attorney, Agent, or Firm—Oblon, Fisher, Spivak, McClelland & Maier

[57] ABSTRACT

A water heating system comprising an outdoor heat exchanger including a heat collection chamber, solar collector panels, collector fins, an evaporator for passing refrigerant therethrough to perform the heat exchange between the refrigerant and the heat transferred from the panels and fins to evaporate the refrigerant. The panels, fins and evaporator are incorporated integrally in the heat collection chamber. A variable rotational speed compressor is connected to the outdoor heat exchanger for compressing the vaporized refrigerant from the evaporator. A heat exchanger disposed on the bottom side in the water storage tank passes the refrigerant vapor from the compressor to perform the heat exchange between the water in the tank and the refrigerant vapor to condense the refrigerant vapor. A variable opening expansion valve adiabatically expands the refrigerant liquefied by the heat exchanger in the tank, thereby decreasing the pressure and temperature of the refrigerant and supplies the refrigerant thus adiabatically expanded to the outdoor heat exchanger. A control unit controls the rotational speed of the compressor and the opening of the expansion valve to maximize the coefficients of performance of the refrigeration cycle in response to the pressures and temperatures measured at various portions in the refrigeration cycle.

14 Claims, 10 Drawing Figures

Water Temp. In Tank — Set Temp. of Water ($\Delta\theta_1$)

Chamber Temp. — Ambient Temp. ($\Delta\theta_2$)

4,481,788

WATER HEATING SYSTEM

BACKGROUND OF THE INVENTION

1. Field of the Invention

The present invention relates to a water heating system, and more particularly to an improvement of coefficients of performance by an active control of the refrigeration cycle of the system.

2. Description of the Prior Art

Recently, a keen attention has been paid to a heat pump water heating system, since it is considered as a system which is not inferior in its energy saving capability to the most popular natural gas water heating system, because of its unique heat transporation function. A heretofore known heat pump water heating system as shown in FIG. 1 has the basic functions of absorbing heat from ambient air, heating up refrigerant by means of a heat pump and storing the heated water in a water tank.

Referring now to FIG. 1, the system function is described specifically. An evaporator 1 absorbs heat from the ambient air blown in by a fan 2 to evaporate liquefied refrigerant. A compressor 3 compresses the evaporated refrigerant to raise the pressure and temperature thereof. A condenser 4 liquefies the refrigerant by heat exchange. An expansion valve 5 causes an adiabatic expansion of the refrigerant to decrease the pressure and temperature thereof. A heat exchanger 6 receives heat from the condenser 4 to heat water, and a circulating pump 7 feeds heated water into a hot water tank 8. However, in this type of prior art heat pump system, in which the difference of the temperature between ambient air and water in the tank 8 is not constant and both the rotational speed of compressor 3 and the opening of the expansion valve 5 are almost fixed, it has been difficult to maximize the coefficient of performance over the operational range of variation of the temperature difference.

As another type of energy saving system, a solar hot water heating system as shown in FIG. 2 is gaining popularity. Referring now to FIG. 2, a solar collector 11 heats water as refrigerant, and the hot water is fed into a heat exchanger 14 by means of a circulating pump 13. Water in a water heating tank 16 is heated by the heat exchanger 14. The hot water from the tank 16 is fed through a pump 17 into a water storage tank 18, where an auxiliary heat source 19 heats the hot water at a suitable temperature. Since this system uses the solar radiation as its heat source, its energy saving capability is excellent but the volume of hot water obtained thereby is limited. Further, solar heat cannot be obtained in cloudy or rainy days, and the heat dissipation from the solar collector 11 to ambient air is increased during winter season. Consequently, the system cannot be used without auxiliary heat sources such as natural gas, fuel oil, electric resistance heater, etc., so that the initial investment of the system is increased, which offsets the advantages of energy saving capability obtained by the solar radiation. In addition, in both systems shown in FIGS. 1 and 2, the energy losses cannot be neglected associated with the circulating pumps, additional heat exchangers, and pipes etc.

SUMMARY OF THE INVENTION

With the above in mind, it is an object of the present invention to provide a water heating system wherein the system structure is simplified by means of an active control of the refrigeration cycle of the heat pump to eliminate the disadvantages of the above-mentioned prior art systems.

It is another object of the present invention to provide a water heating system wherein the rotational speed of compressor and the opening of expansion valve are controlled by a microcomputer in response to the required temperature rise of the refrigeration cycle to maximize the coefficient of performance over the operational range of temperature difference without assistance from any auxiliary heat source.

It is a further object of the present invention to provide a water heating system wherein the solar radiation, if any, can be used as a heat source for the heat pump and wherein, in response to the energy obtained from this heat source, temperature rise of the refrigeration cycle is controlled by means of an active control of the heat pump, thereby increasing substantially the coefficient of performance of the system in comparison to the heat pump system alone.

In order to achieve these objects, a water heating system according to the present invention comprises an outdoor heat exchanger including a heat collection chamber, a first heat transfer member receiving and transferring solar radiation heat, a second heat transfer member receiving and transferring the heat of ambient air, an evaporator for passing refrigerant therethrough to perform the heat exchange between the refrigerant and the heat transferred from the first and second heat transfer members, thereby evaporating the refrigerant. The first and second heat transfer members and the evaporator are incorporated integrally in the heat collection chamber. The water heating system further comprises a compressor of variable rotational speed connected to the outdoor heat exchanger for compressing the vaporized refrigerant from the evaporator to increase the pressure and temperature of the vaporized refrigerant, a water storage tank for storing water, a heat exchanger disposed on the bottom side in the water storage tank for passing the refrigerant vapor from the compressor and for performing the heat exchange between the water contained in the water storage tank and the refrigerant vapor to condense the refrigerant vapor, a variable opening expansion valve for adiabatically expanding the refrigerant condensed to be liquefied by the heat exchanger in the water storage tank to decrease the pressure and temperature of the refrigerant and for supplying the refrigerant thus adiabatically expanded to the outdoor heat exchanger. The system further comprises first and second pressure measuring means for measuring the saturation vapor pressure $p_1$ and the saturation condensation pressure $p_2$ of the refrigerant passing through the outdoor heat exchanger and the heat exchanger in the water storage tank, respectively, first, second, third, fourth and fifth temperature measuring means for measuring the suction side temperature $t_1$ of the compressor, the inlet side temperature $t_2$ of the expansion valve, the temperature $t_3$ in the heat collection chamber, the temperature $t_4$ of the ambient air and the temperature $t_5$ of the water in the water storage tank, respectively, and control means for controlling the rotational speed of the compressor and the opening of the expansion valve so as to maximize or substantially maximize the coefficients of performance of the refrigeration cycle including the outdoor heat exchanger, the compressor, the heat exchanger in the water storage tank and the expansion valve, in response to the data of the pressure and the temperature measured by the first and second pressure measuring means and the first, second, third, fourth and fifth temperature measuring means.

In a preferred embodiment of the invention, the controlling means comprises means for determining the first temperature difference between the water temperature $t_5$ and a set temperature, means for determining the second temperature difference between the temperature $t_3$ in the heat collection chamber and the temperature $t_4$ of the ambient air, means for deciding whether an open loop control is necessary or not in accordance with the first and second temperature differences, means for determining the third temperature difference between the water temperature $t_5$ and the temperature $t_3$ of the heat collection chamber, means for determining the fourth temperature difference between the water temperature $t_5$ and the temperature $t_4$ of the ambient air, first memory means for storing the relations between the third and fourth temperature differences and the rotational speed $y_1$ of the compressor and the opening $y_2$ of the expansion valve, respectively, and means for reading out the rotational speed $y_1$ and the opening $y_2$ corresponding to the third and fourth temperature differences from the first memory means when the open loop control is necessary and for performing the open loop control of the compressor and the expansion valve by the read out rotational speed $y_1$ and the opening $y_2$, respectively.

It is preferable that the controlling means calculates the fine adjustment $\Delta y_1$ of the rotational speed of the compressor and the fine adjustment $\Delta y_2$ of the opening of the expansion valve in accordance with the following expression:

$$\begin{cases} \Delta y_1 = Ax_1 + Bx_2 \\ \Delta y_2 = Cx_1 + Dx_2 \end{cases}$$

wherein, $x_1$ and $x_2$ represent temperature deviations of degrees of superheat and subcool at present from ideal values of degrees of superheat and subcool, respectively, and A, B, C and D represent sensitivity coefficients determined as functions of the saturation evaporation temperature $t_{10}$ and the saturation condensation temperature $t_{20}$, the temperatures $t_{10}$ and $t_{20}$ being determined as functions of the saturation evaporation pressure $p_1$ and the saturation condensation pressure $p_2$ obtained by the first and second pressure measuring means.

It is also preferable that the controlling means comprises second memory means for storing the function between the saturation evaporation pressure $p_1$ and the saturation evaporation temperature $t_{10}$ and the function between the saturation condensation pressure $p_2$ and the saturation condensation temperature $t_{20}$, respectively, third memory means for storing the ideal degree of superheat $\Delta t_{10}$ and the ideal degree of subcool $\Delta t_{20}$, and means for calculating the temperature deviations $x_1$ and $x_2$ corresponding to the outputs read out from the second and third memory means, in accordance with the following expressions:

$$\begin{cases} x_1 = (t_1 - t_{10}) - \Delta t_{10} \\ x_2 = (t_2 - t_{20}) - \Delta t_{20} \end{cases}$$

Preferably, the outdoor heat exchanger comprises means for introducing the ambient air into the heat collection chamber. The controlling means controls the introducing means in response to the fifth temperature difference between the temperature $t_3$ in the heat collection chamber and the temperature $t_4$ of the ambient air, to supply the ambient air to the heat collection chamber when the fifth temperature difference is lower than a predetermined value and this state continues for a predetermined period of time, and not to supply the ambient air to the heat collection chamber when the fifth temperature difference is higher than the predetermined value and this state continues for the predetermined period of time but to supply only the solar radiation heat collected by the first heat transfer member to the heat collection chamber.

Further, the controlling means may comprise means for determining a period of time, for example, a predetermined time period of daytime, during which the refrigeration cycle is enabled.

In another aspect of the invention, a water heating system comprises sixth and seventh temperature measuring means for measuring the temperature $t_6$ in the evaporator and the temperature $t_7$ in the heat exchanger in the water storage tank, respectively, instead of the above-mentioned first and second pressure measuring means.

In this case, it is preferable that the controlling means comprises, means for determining the first temperature difference between the water temperature $t_5$ and a set temperature, means for determining the second temperature difference between the temperature $t_3$ in the heat collection chamber and the temperature $t_4$ of the ambient air, means for deciding whether an open loop control is necessary or not in accordance with the first and second temperature differences, means for determining the third temperature difference between the water temperature $t_5$ and the temperature $t_3$ of the heat collection chamber, means for determining the fourth temperature difference between the water temperature $t_5$ and the temperature $t_4$ of the ambient air, fourth memory means for storing the relations between the third and fourth temperature differences and the rotational speed $y_1$ of the compressor and the opening $y_2$ of the expansion valve, respectively, and means for reading out the rotational speed $y_1$ and the opening $y_2$ corresponding to the third and fourth temperature differences from the fourth memory means when the open loop control is necessary and for performing the open loop control of the compressor and the expansion valve by the read out rotational speed $y_1$ and the opening $y_2$, respectively.

It is also preferable that the controlling means calculates the fine adjustment $\Delta y_1$ of the rotational speed of the compressor and the fine adjustment $\Delta y_2$ of the opening of the expansion valve in accordance with the following expression:

$$\begin{cases} \Delta y_1 = Ax_1 + Bx_2 \\ \Delta y_2 = Cx_1 + Dx_2 \end{cases}$$

wherein, $x_1$ and $x_2$ represent temperature deviations of degrees of superheat and subcool at present from ideal valued of degrees of superheat and subcool, respectively, and A, B, C and D represent sensitivity coefficients determined as functions of the saturation evaporation temperature $t_{10}$ and the saturation condensation temperature $t_{20}$, obtained by the fifth and sixth temperature measuring means.

It is also preferable that the controlling means comprises fifth memory means for storing the ideal degree of superheat $\Delta t_{10}$ and the ideal degree of subcool $\Delta t_{20}$, and means for calculating the temperature deviations $x_1$ and $x_2$ corresponding to the outputs read out from the fifth memory means, in accordance with the following expressions:

$$\begin{cases} x_1 = (t_1 - t_{10}) - \Delta t_{10} \\ x_2 = (t_2 - t_{20}) - \Delta t_{20} \end{cases}$$

By incorporating the solar collector integrally into the the outdoor heat exchanger of heat pump, additional heat exchanger and circulating pumps are not required, so that the efficiency of the system is increased and in turn the initial investment cost is decreased.

BRIEF DESCRIPTION OF THE DRAWINGS

Preferred embodiments of the present invention are described in detail below with reference to the accompanying drawings, which illustrate only specific embodiments, in which.

DETAILED DESCRIPTION OF THE PREFERRED EMBODIMENTS

Figure 1:
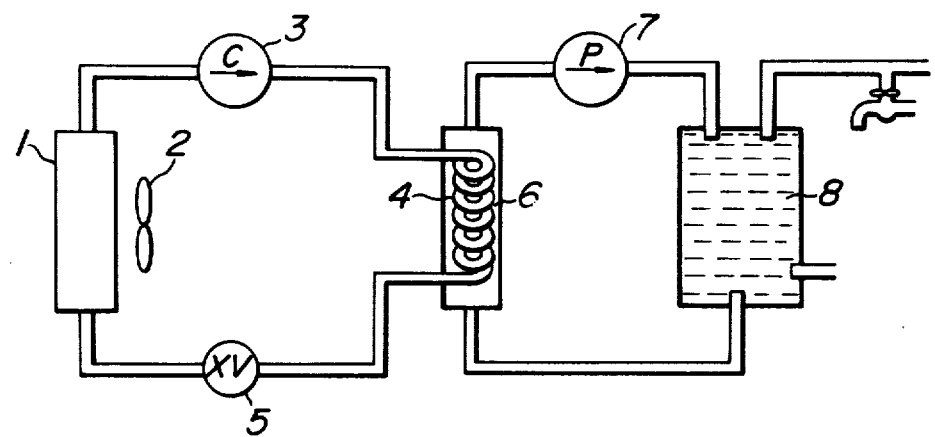
FIG. 1 is a block diagram showing an example of a known heat pump water heating system.
Figure 2:
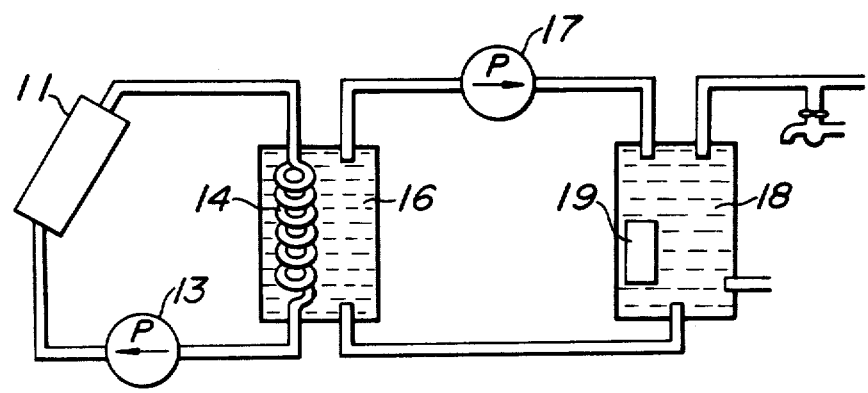
FIG. 2 is a block diagram showing an example of a known solar hot water heating system.
Figure 3:
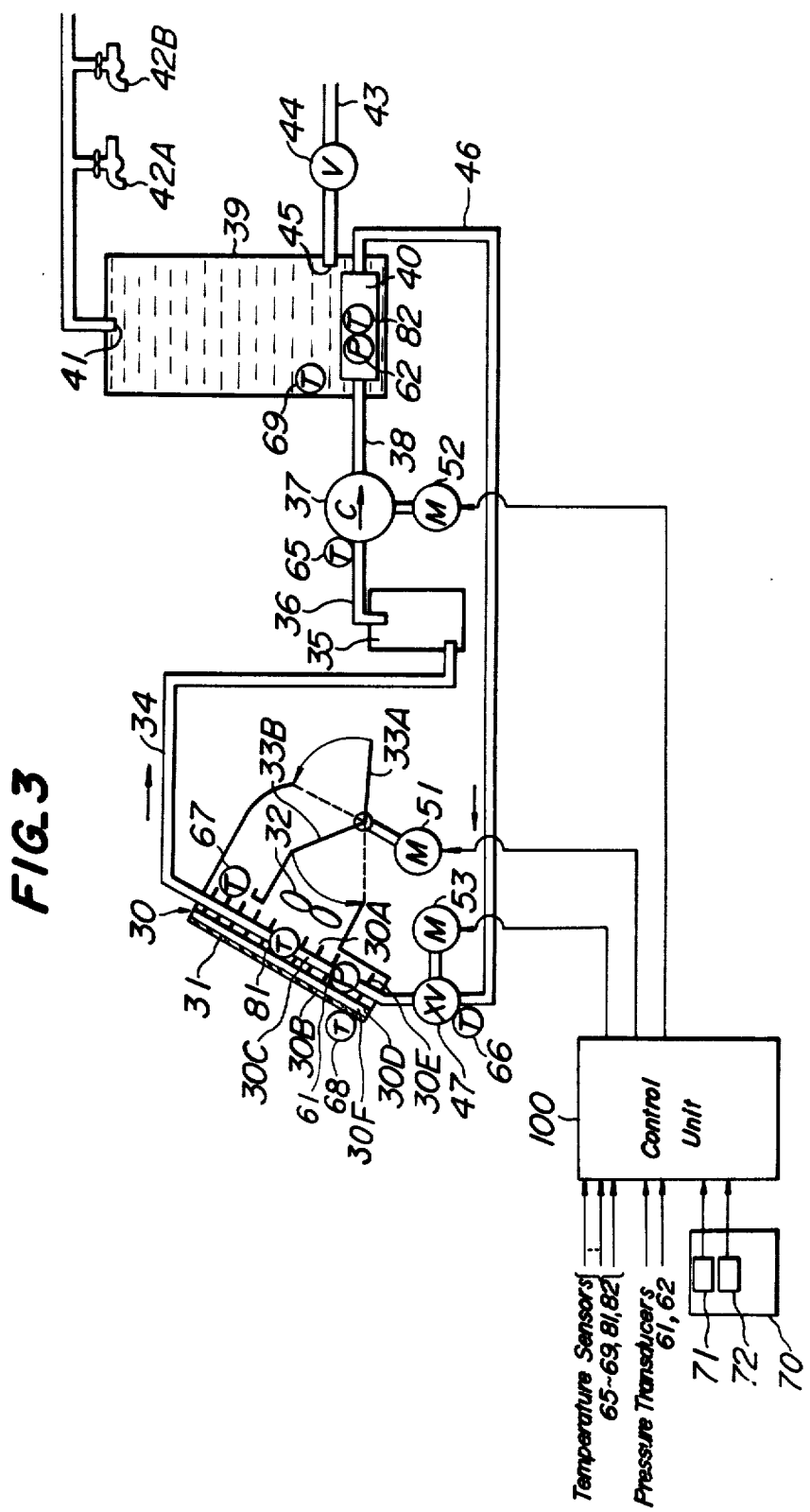
FIG. 3 is a system block diagram showing the structure of an embodiment of a water heating system according to the present invention.

FIG. 3 is a system diagram showing a preferred embodiment of a water heating system according to the invention. Freon is used as the refrigerant for this system.

An outdoor heat exchanger 30 as shown in FIG. 3 houses a heat collection chamber 30A and a glass plate 30B which seals the front side of the heat collection chamber 30A. An evaporator 30C is disposed in the heat collection chamber 30A, and the evaporator 30C is fitted as a unit with solar collector panels 30D, each having an L shaped section, as shown in FIG. 3, for receiving solar heat through the glass plate 30B and transmitting the received heat to the evaporator 30C and collector fins 30E for collecting the heat of ambient air and transmitting this heat to the evaporator 30C. Further, it is preferable to form an air insulation chamber 30F between the glass plate 30B and the solar collector panels 30D for improving the heat insulation characteristics.

Air is blown into the heat collection chamber 30A by means of a fan 32. The heat collection chamber 30A has a closed structure inside the outdoor heat exchanger 30 and when dampers 33A and 33B are held open, as shown by the solid lines in FIG. 3, the fresh outdoor air is blown into the chamber 30A by the fan 32, to transfer heat thereof to the heat exchanger 30 and then discharged from the heat exchanger 30 to the ambient air. When the dampers 33A and 33B are held closed, as shown by the dotted lines in FIG. 3, the air contained in the heat collection chamber 30A is circulated inside the heat exchanger 30 only by means of the fan 32.

Heated refrigerant from the heat exchanger 30 is fed through a refrigerant passage 34 to an accumulator 35, wherein the vapor of the refrigerant is separated from the liquefied portion of the refrigerant. The vapor of the refrigerant thus separated is fed through a passage 36 to a variable speed compressor 37 such as variable rotary speed compressor, where the low-pressure vapor of the refrigerant from the accumulator 35 is compressed into a high-pressure vapor.

This high-pressure vapor of the refrigerant is fed through a refrigerant passage 38 to an in-tank heat exchanger 40 as a condenser which is mounted on the bottom side of a water storage tank 39. This tank 39 is insulated to store the hot water at a predetermined temperature. The heat exchanger 40 transfers heat from the high-pressure refrigerant vapor to the hot water contained in the tank 39. The hot water in the tank 39 is fed through an outlet port 41 to water faucets 42A, 42B and so on to supply hot water for various purposes. Cold water is added from a water inlet port 45 via a pressure reducing and check valve 44 which is connected to a refrigerant passage 43.

The liquefied refrigerant after heat transfer in the heat exchanger 40 is fed via a refrigerant passage 46 to a variable opening expansion valve 47, where the liquefied refrigerant is subject to an adiabatic expansion to become a mixed phase refrigerant with low pressure and temperature. The expansion valve 47 controls the pressure difference between high and low sides of the refrigeration cycle. The refrigerant thus obtained is fed into the heat exchanger 30.

The above described dampers 33A and 33B installed in the outdoor heat exchanger 30 are operated by a reversible motor 51. The compressor 37 is driven by a variable speed induction motor 52 to rotate at a desired rotational speed. The opening of the expansion valve 47 is controlled by a stepping motor 53 so that the valve 47 is held at a desired opening.

The drive and control of each of these motors 51, 52 and 53 is made by a control unit 100 as will be described later with referring to FIG. 4. For this purpose, pressure transducers 61 and 62 are installed respectively inside the outdoor heat exchanger 30 and the in-tank heat exchanger 40 to measure the saturated evaporating pressure $p_1$ and the saturated condensing pressure $p_2$ of the refrigerant moving through inside the respective heat exchangers 30 and 40. In this embodiment, these transducers are of piezo-electric type which can be used also as high-pressure relief sensors. When saturated evaporating pressures are measured by the pressure transducers 61 and 62, saturated evaporating temperature and saturated condensing temperature can be calculated as functions of respective saturated evaporating and condensing pressures.

A temperature sensor 65 is installed at the inlet of the variable speed rotary compressor 37 and measures the temperature $t_1$ on the suction side of the compressor 37 which corresponds to the outlet on the low-pressure side of refrigeration cycle. Another temperature sensor 66 is installed at the inlet of the variable opening expansion valve 47 and measures the temperature $t_2$ at the inlet of the expansion valve 47 which corresponds to the outlet on the high pressure side of refrigeration cycle.

Based on these measured temperatures and the above described saturated evaporating temperature and saturated condensating temperature, the degrees of superheat and subcool of refrigerant can be calculated as will be described later. A temperature sensor 67 located in the heat collection chamber 30A measures the temperature $t_3$ inside the heat collection chamber 30A, while a sensor 68 located outside the outdoor heat exchanger 30 measures the ambient temperature $t_4$. The operation of the dampers 33A and 33B of the outdoor heat exchanger 30 is based on the temperature measurement. A temperature sensor 69 measures the temperature $t_5$ of water contained in the water storage tank 39. In this example, these temperature sensor 65 through 69 can be of thermistor type.

On the control board 70, there are provided an on-off switch 71 which puts the water heating system in operation and a temperature indicator 72 which sets the temperature of hot water in the tank 39 at a desired value.

Based on the positions of the on-off switch 71 and the temperature indicator 72 and the outputs from pressure transducers 61 and 62 and temperature sensors 65 through 69, determination is made as to the start/stop of the water heating system of the present invention, the operation of dampers 33A and 33B in the outdoor heat exchanger 30, the rotational speed of the variable speed rotational compressor 37 and the opening of the variable opening expansion valve 47.

The arrangement of the control unit 100 and portions relating thereto will be described below in detail with reference to the block diagram shown in FIG. 4.

Figure 4:
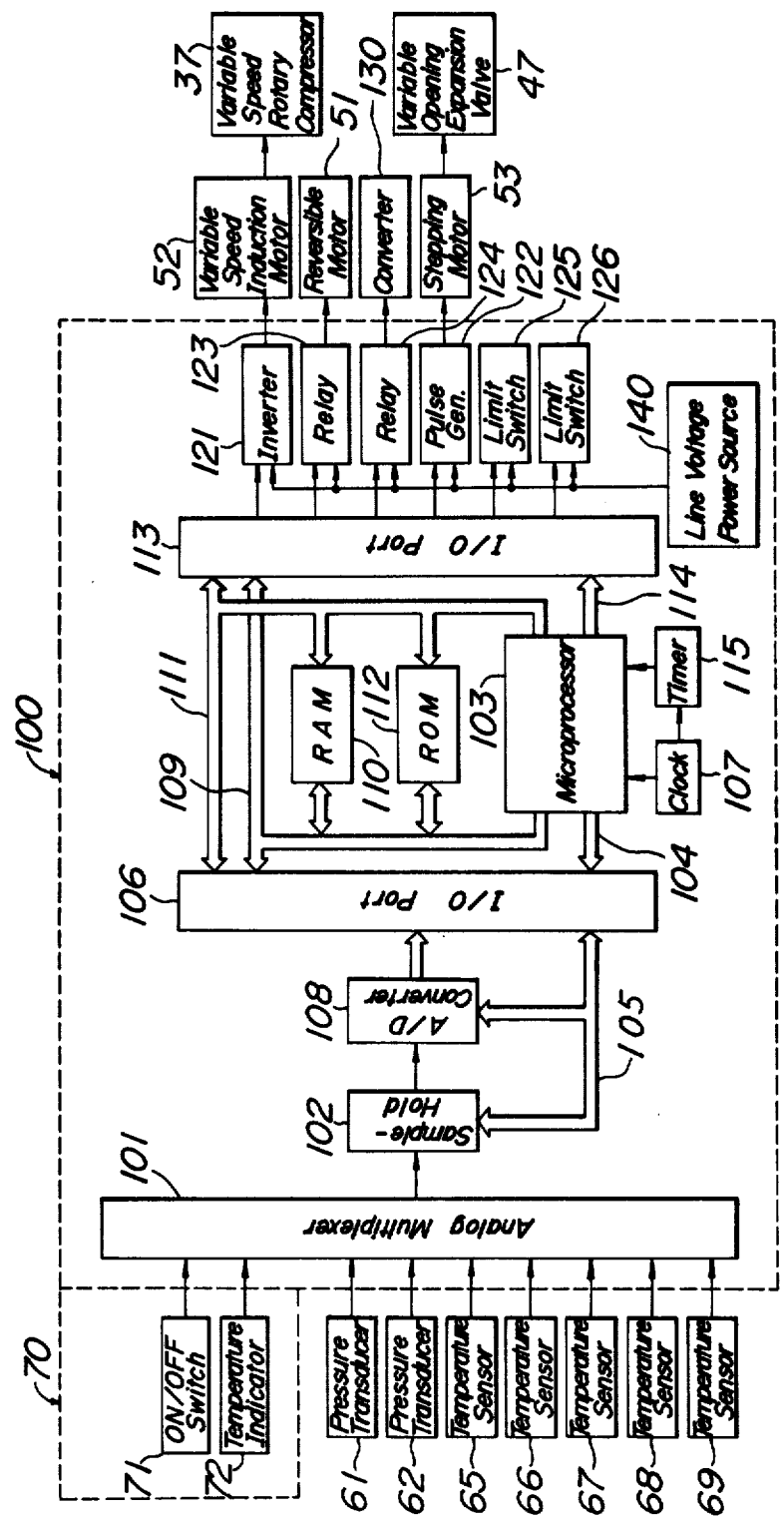
FIG. 4 is a block diagram showing a preferred embodiment of the control unit used in the system shown in FIG. 3.

As indicated in FIG. 4, the control unit 100 enclosed by the dotted line is interfaced with the peripheral equipments outside the dotted line. First, the input to the control unit 100 is described. The signals obtained from the pressure transducers 61 and 62 and the temperature sensors 65 through 69 are fed into the control unit 100 after the detected voltages of the signals are amplified and impedance-transformed by the signal conditioners attached to these transducers and sensors. The input signals are successively sampled by an analog multiplexer 101 and then supplied to a sample-hold 102. The analog multiplexer 101 and the sample-hold 102 receive the control signals from a microprocessor 103 via control buses 104 and 105 and an input/output port 106. As the microprocessor 103, the 6502 in the form of large-scale integrated circuit (LSI hereinafter) can be used. A clock signal is supplied to this microprocessor 103 by a clock generator 107 which contains a crystal-controlled oscillator. The signals from the sample-hold 102 are supplied to an A/D converter 108 where the signals are converted into the digital signals of 8 bits and then transferred to the input/output port 106. The A/D converter 108 receives the control signals from the microprocessor 103 for conversion via the control buses 104 and 105 and the input/output port 106. The 6520 of LSI, for example, can be used for the input/output port 106. The data taken into the input/output port 106 is stored in a RAM 110 through a data bus 109 which consists of 8 bits. The address of the RAM 110 is given from the microprocessor 103, via an address bus 111 which consists of 16 bits. Under the control of the microprocessor 103, the program written in a ROM 112 is executed, and the data stored in the RAM 110 are supplied through the data bus 109 to the microprocessor 103, where the necessary processing is performed. The result of the processing is supplied through the data bus 109 and through an input/output port 113 to the respective equipments. This output function is performed by issuing control signals from the microprocessor 103 through the control bus 114 and the input/output port 113. In this embodiment, the 2114 of LSI is used for the RAM 110, and the 2716 of LSI is used for the ROM 112. A timer 115 receives the signal from the clock generator 107 to clock the necessary time and to send the clock signal to the microprocessor 103.

Various output equipments are controlled as follows, based upon the processing performed. The rotational speed of the variable speed rotary compressor 37 is controlled by generating a variable frequency and variable amplitude signal by an inverter 121 and applying the signal to the variable speed induction motor 52. The opening of the variable opening expansion valve 47 is controlled by generating pulses by a pulse generator 122 and applying the signal to the stepping motor 53. The direction of the rotation of the reversible motor 51 is dictated by a relay 123. Connecting and disconnecting a utility electric outlet or line voltage power source 140 to a converter 130 is directed by a relay 124, and the converter 130 converts the AC signal from the line voltage power source 140 into a DC signal which is then applied to the inverter 121. Limit switches 125 and 126 shown in FIG. 4 are installed on the dampers 33A and 33B in the outdoor heat exchanger 30 to detect the position of these dampers 33A and 33B.

The operation of the preferred embodiment is roughly classified into 5 steps:
(1) Start and stop of the system,
(2) Opening and closing of the dampers in the outdoor heat exchanger,
(3) Open loop control of the system,
(4) Closed loop control of the system, and
(5) Water supply to the water storage tank.
These steps are sequentially described below by referring to FIGS. 3 and 4.

First, the start and stop of the system is explained below for the present invention. The water heating system of this embodiment is to produce a volume of hot water of average daily use by heating up utility water for 8 to 10 hours during the daytime, and the volume of the water storage tank 39 is set at about 120% of the volume of average daily use of hot water. In order to increase the coefficient of performance, the water heating system of this embodiment performs heat collecting operation during the daytime without regard to the existence of the solar radiation. This is because the heat collection can be performed when the ambient temperature is raised during daytime, even though there is no solar radiation. Accordingly, the heat collection time is limited by the timer 115 to a daytime period except for any emergency interrupt.

Figure 5:
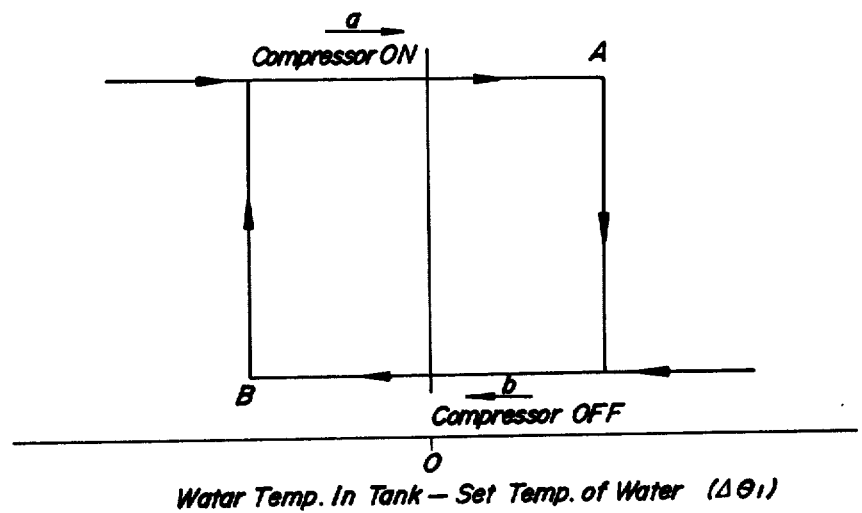
FIGS. 5 and 6 are control logic diagrams illustrating the hysteresis control used in the embodiment according to the invention.

FIG. 5 illustrates the logic of opening and closing of the relay 124 for switching on and off of the line voltage power source 140 to the converter 130 to start and stop the water heating system of the present embodiment of the invention, respectively. More specifically, the abscissa represents the temperature difference $\Delta\theta_1$ of the water in the water storage tank 39 measured by the temperature sensor 69 and the set value of the indicator 72, and the ordinate shows the opening and closing position of the relay 124. The opening and closing operation of the relay 124 cannot be performed, unless the timer 115 is in the "ON" position as described above.

Figure 6:
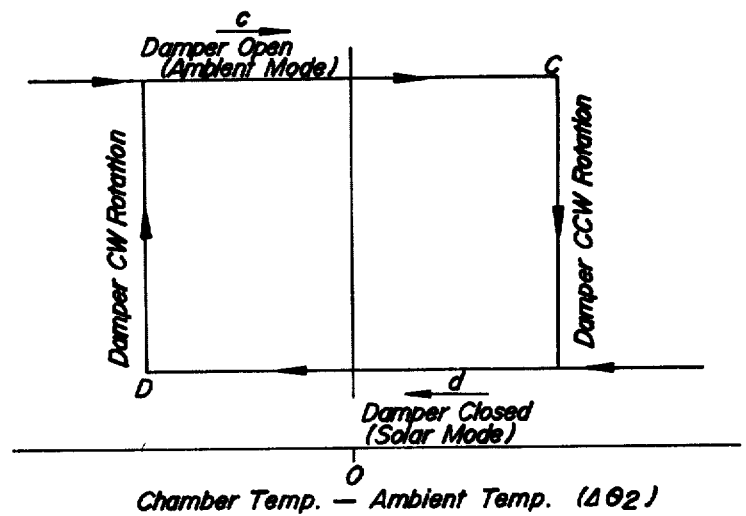

Accordingly, when the timer 115 becomes "ON" at a predetermined instant in the morning, and when the water temperature in the tank 39 is sufficiently lower than the set temperature, e.g., the difference $\Delta\theta_1$ is lower than "+2° C." in FIG. 6, the relay 124 is energized to close so that the line voltage power source 140 is applied to the converter 130. As the hot water temperature in the tank 39 is increased, logic proceeds as shown by the arrow "a" in FIG. 5.

Since the heat exchanger 40 is mounted on the bottom of the water storage tank 39 in this embodiment, the cold water consisting of the lower layer of the double stratified hot water in the tank 39 is first heated uniformly by the heat exchanger 40. When the temperature of the lower layer reaches to the upper layer, then the whole volume of the water in the tank 39 is heated uniformly. At point A in FIG. 5, where the difference $\Delta\theta_1$ becomes equal to "+2° C.", the relay 124 flips to be opened, and the line voltage power source 140 is disconnected from the converter 130. When starting the water heating system, the water temperature must be sufficiently low so that the logic in FIG. 5 proceeds as shown by the arrow "b" arriving at Point B, where the difference $\Delta\theta_1$ becomes equal or less than "−2° C.", for example, and the relay 124 stays in the "OFF" position.

When starting the water heating system, the variable opening expansion valve 47 should be closed, and the rotational speed of the variable speed rotary compressor 37 is gradually increased. When the pressure on the high-pressure side of the refrigeration cycle detected by the pressure transducer 62 exceeds a set value, the water heating system assumes the steady state operation where open and closed loop control is taking place. In order to stop the water heating system when the difference $\Delta\theta_1$ becomes higher than "+2° C.", the rotational speed of the variable speed rotary compressor 37 is decreased gradually while the variable opening expansion valve 47 is being closed, and upon the completion of closing the variable opening expansion valve 47, the relay 124 flips "OFF", so that the line voltage power source 140 is disconnected from the converter 130. This operation is performed automatically by the microprocessor 103 under the control of the program stored in the ROM 112 within the control unit 100 shown in FIG. 4.

The steps of opening and closing the dampers 33A and 33B in the outdoor heat exchanger will now be described below.

When these dampers 33A and 33B are at the open position, heat is absorbed from the fresh ambient air, so that this mode of operation will be referred to hereinafter, as "Atmospheric or Ambient Mode". When the dampers 33A and 33B are at the closed position, heat is absorbed from the air which is heated up by solar and circulated inside the heat collection chamber 30A, so that this mode of operation is referred to hereinafter as "Solar Mode".

The selection whether the outdoor heat exchanger 30 operates in Atmospheric Mode or Solar Mode is an important factor for the improvement of the coefficient of performance. Therefore, either one of the heat collection modes is selected by comparing the values $t_3$ and $t_4$ indicated, respectively, by the temperature sensor 67 installed inside the heat collection chamber 30A in the outdoor heat exchanger 30, and by the ambient temperature sensor 68 mounted on the outside of the outdoor heat exchanger 30.

When there is solar radiation, the temperature in the heat collection chamber 30A is increased due to the radiation. Therefore, the temperature $t_3$ of the heat collection chamber 30A indicated by the temperature sensor 67 becomes higher than the ambient temperature $t_4$ indicated by the ambient temperature sensor 68. The heat collection mode of the outdoor heat exchanger 30 is reversed by closing or opening the dampers 33A and 33B under the control of the microprocessor 103 in response to a condition that the difference between $t_3$ and $t_4$ is equal to or greater than a set value and the condition continues longer than a certain period of time in the Atmospheric Mode, or in response to a condition that the temperature condition contrary to one described above continues longer than a certain period of time in the Solar Mode.

FIG. 6 illustrates the normal and reverse directions of the relay 123 to open or close the dampers 33A and 33B of the outdoor heat exchanger 30. More specifically, the abscissa represents the temperature difference $\Delta\theta_2$ between the temperature sensor 67 inside the heat collection chamber 30A and the ambient temperature sensor 68, while the ordinate represents the open and closed positions of the dampers 33A and 33B. Further, the position of the relay 123 cannot be reversed, unless the same state illustrated in FIG. 6 continues for a predetermined period of time.

At the start of the water heating system, when the temperature of heat collection chamber 30A is relatively lower with respect to the atmospheric temperature, e.g., the temperature difference $\Delta\theta_2$ is lower than "+3° C." in FIG. 6, the relay 123 is energized to make a clockwise rotation of the reversible motor 51 and the dampers 33A and 33B of the outdoor heat exchanger 30 are opened to select the Atmosphere Mode. As the amount of solar radiation is increased, the temperature in the heat collection chamber 30A rises to proceed as shown by the arrow "C" in FIG. 6. At point C where the temperature difference $\Delta\theta_2$ reaches "+3° C.", the relay 123 is energized to make a counter-clockwise rotation of the reversible motor 51 and the dampers 33A and 33B are closed to select the Solar Mode. Similarly, when the temperature in the heat collection chamber 30A is decreased with respect to the ambient temperature to proceed as shown by the arrow "d" in FIG. 6, the temperature difference $\Delta\theta_2$ reaches "−3° C." for example, at point D, where the relay 123 causes the reversible motor 51 to change from a counter-clockwise rotation to a clockwise rotation, so that the dampers 33A and 33B of the outdoor heat exchanger 30 are opened to change from the Solar Mode to the Atmospheric Mode. Further, when the dampers 33A and 33B reach their fully opened or closed position, the limit switches 125 and 126 of the dampers 33A and 33B are closed, so that the relay 123 assumes its neutral position to disconnect the reversible motor 51 from the line voltage power supply 140.

Now, the open loop control of the water heating system is described in detail below.

Figure 7:
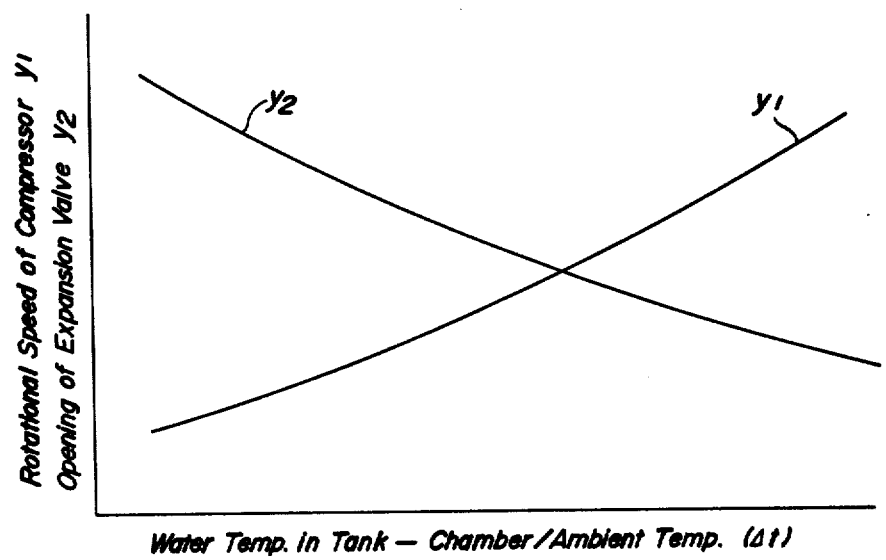
FIG. 7 is a diagram showing on the abscissa the temperature difference $\Delta t$ between the water in the water storage tank and the air in the heat collection chamber or the ambient air and on the ordinate the rotational speed $y_1$ of the rotary compressor and the opening $y_2$ of the expansion valve.

As is clear from the description of the U.S. patent application Ser. No. 394,866 by the same inventor, when the temperature of the hot water in the water storage tank 39 and the temperature of either the heat collection chamber 30A or the ambient temperature are known, the rotational speed of the variable speed rotary compressor 37 and the opening of the variable opening expansion valve 47 can be determined approximately, and then the saturated condensing and evaporating temperatures and therefore the saturated condensing and evaporating pressures of the water heating system are also determined. Therefore, the above described relations based on experiments with an actual hardware and on simulation experiments should be stored in the ROM 112 of the control unit 100 in the form of curves as illustrated in FIG. 7 or in the form of approximate formulae such as quadratic equations. In other words, by storing the relation like one shown in FIG. 7 in ROM 112, the rotational speed $y_1$ of the variable speed rotary compressor 37 and the opening $y_2$ of the variable opening expansion valve 47 can be approximately determined, given the temperature difference of water in water storage tank 39 and ambient air or heat collection chamber 30A. This is a program control based upon the experimental results only and does not make use of the feedback of the present system state variables, so that this is referred to as an open loop control. This open loop control is necessary for the starting and stopping the system or for the switch of heat collection mode. Consequently, this type of control is called "Major Cycle", compared to "Minor Cycle", which will be described later.

The flow of steps of the open loop control is explained below with reference to the flow charts shown in FIGS. 8, 9A and 9B.

First, step S1 determines whether the refrigeration cycle is to be stopped or not. More particularly, when the on-off switch 71 shown in FIG. 3 is "ON", and when the control loop in FIG. 5 is in the "ON" state in accordance with the difference $\Delta\theta_1$ between the hot water temperature $t_5$ indicated by the temperature sensor 69 in the water storage tank 39 and the set temperature indicated by the indicator 72, then the flow enters step S2. If decision is given affirmatively in step S1, the flow proceeds to step S9, and the relay 124 is deenergized to disconnect the line voltage power supply 140 from the converter 130 and to stop the operation of the rotary compressor 37.

Step S2 measures the temperature $t_3$ in the heat collection chamber 30A and the ambient temperature $t_4$ by the temperature sensors 67 and 68, respectively, and compares the two temperatures. Further, the temperature $t_5$ of the water in the water storage tank 39 is measured by the temperature sensor 69. Next, step S3 is entered where it is determined whether the open loop control is necessary following the start or stop of the water heating system and the switch of heat collection mode, in accordance with the temperature difference between the temperature sensors 67 and 68 and the temperature difference $\Delta\theta_1$ between the temperature sensor 69 and the set temperature.

When an affirmative decision is made in step S3, step S4 is entered where a sequential operation necessary for starting or stopping the water heating system and switching the heat collection mode are performed. If the operation is not necessary, then the flow proceeds to step S8 where the closed loop control is performed. When an affirmative decision is made in step S3, step S5 is entered via step S4 where the rotational speed $y_1$ of the rotary compressor 37 and the opening $y_2$ of the variable opening expansion valve 47 are calculated by referring to the table look-up stored in the ROM 112 based on the temperature difference between the water temperature $t_5$ in the water storage tank 39 and the temperature $t_3$ in the heat collection chamber 30A or the ambient temperature $t_4$. Next, in step S6, the signals concerning the rotational speed $y_1$ of the rotary compressor 37 and the opening $y_2$ of the variable opening expansion valve 47 are converted into appropriate forms as input signals to the inverter 121 and the pulse generator 122, respectively. The signals thus obtained are applied to the inverter 121 and the pulse generator 122 through the input/output port 113, respectively. In the following step S7, the output of the inverter 121 is applied to the variable induction motor 52 to control the rotational speed of the compressor 37, and the output of the pulse generator 122 is applied to the stepping motor 53 to control the opening of the variable opening expansion valve 47. Thereafter, the closed loop control is entered via step S8.

Next, the flow of steps of the closed loop control of the rotational speed of the compressor 37 and the opening of the variable opening expansion valve 47 for optimizing the degrees of superheat and subcool is explained below with reference to the flow charts of FIGS. 9A and 9B.

Figure 8:
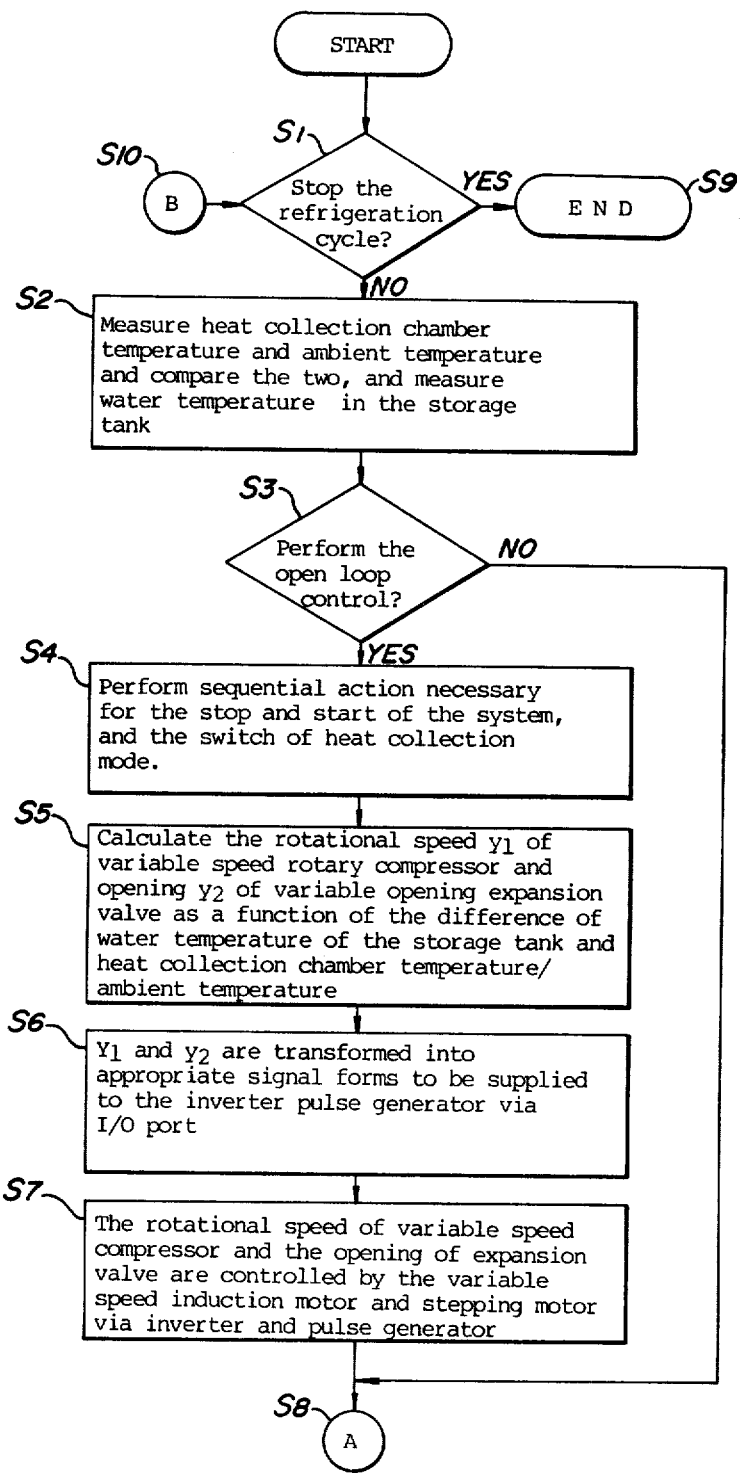
FIGS. 8, 9A and 9B are flow charts illustrating the control steps of the preferred embodiment of the present invention.
Figure 9A:
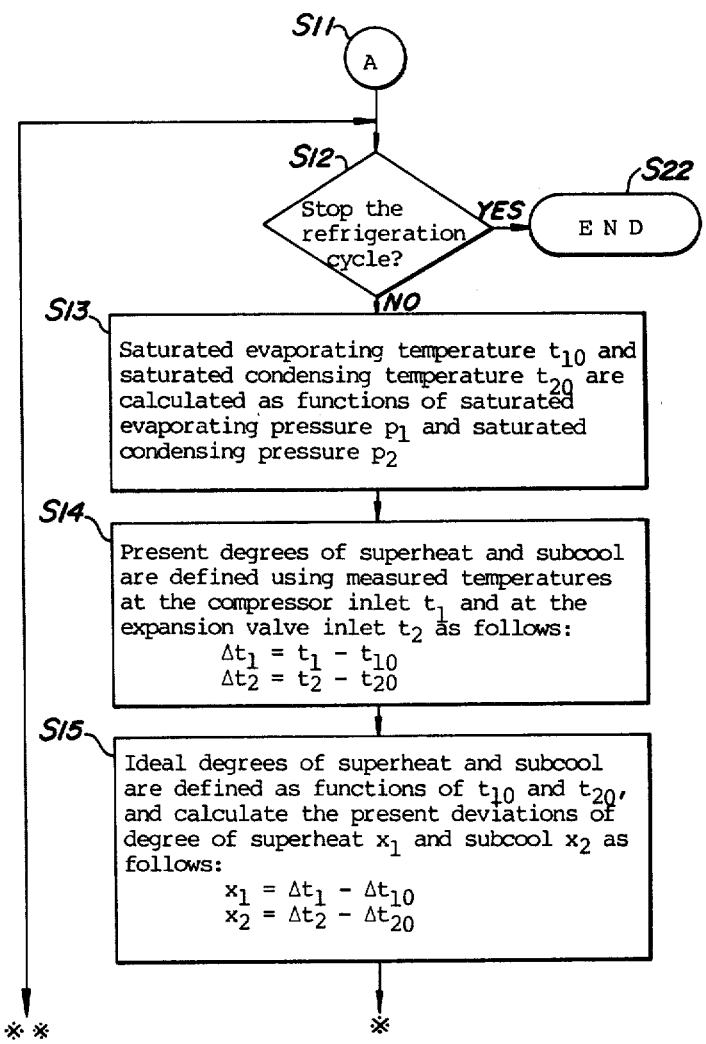
Figure 9B:
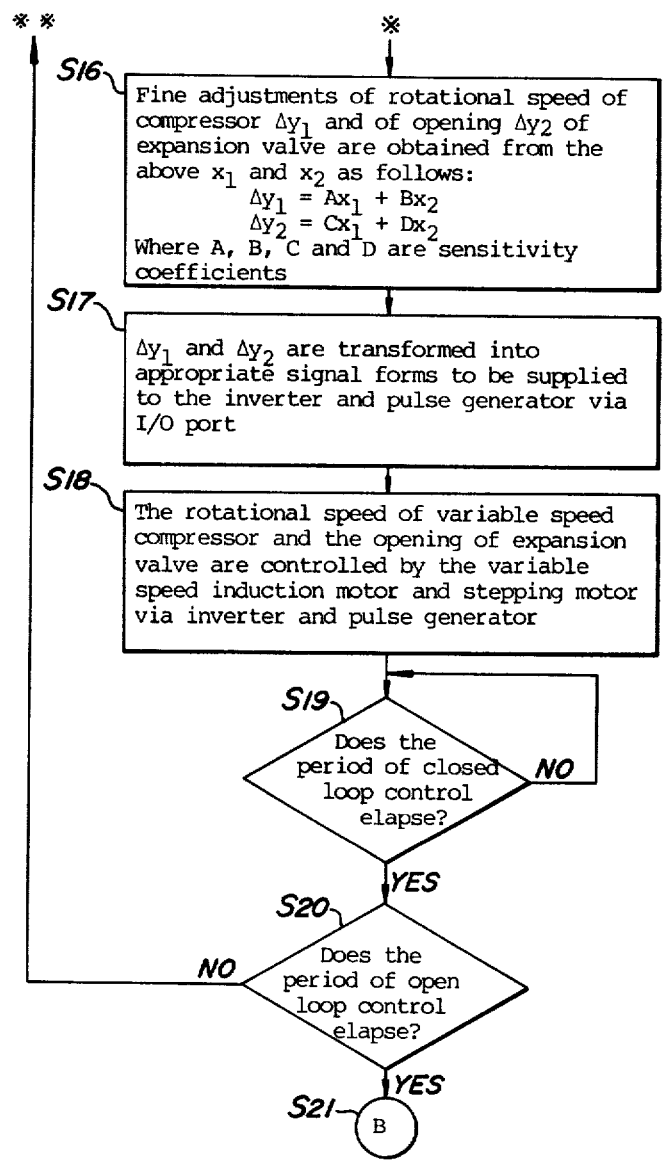

First in step S12, it is decided whether the refrigeration cycle is to be stopped or not as in the case of step S1 shown in FIG. 8. Step S13 is entered in case of the negative decision, while step S22 is entered in case of the affirmative decision. In the latter case, the relay 124 is "opened" to interrupt the power supply of commercial electricity to the converter 130 and accordingly to stop the operation of the compressor 37. In the case where step S13 is entered, a saturation evaporation pressure $p_1$ and a saturation condensation pressure $p_2$ are measured, respectively, by the pressure transducers 61 and 62, and the thus measured results are temporarily stored in the RAM 112 in the control unit 100. On the other hand, a saturation evaporation temperature $t_{10}$ and a saturation condensation temperature $t_{20}$ are predetermined in advance as functions of the saturation evaporation pressure $p_1$ and the saturation condensation pressure $p_2$, respectively, according to the function in expression (1).

$$\begin{cases} t_{10} = f(p_1) \\ t_{20} = f(p_2) \end{cases}$$

These predetermined results are stored in the ROM 112 as table look up in the form of pairs of the saturation evaporation temperature $t_{10}$ and the saturation condensation temperature $t_{20}$ corresponding to the pressures $p_1$ and $p_2$, respectively. Then, the saturation evaporation temperature $t_{10}$ and the saturation condensation temperature $t_{20}$ are determined through interpolation or extrapolation of the functions from the table look up in the ROM 112 by using any given measured pressure values $p_1$ and $p_2$ stored in the RAM 110.

Further, in place of determining the temperatures from the pressures as described above, a temperature within the evaporator 30C per se can be measured by a temperature sensor 81 disposed in the evaporator 30C, and a temperature within the heat exchanger 40 in the water storage tank 39 can be measured by a temperature sensor 82 disposed in the heat exchanger 40.

Next in step S14, the temperature $t_1$ at the inlet of the variable compressor 37 and the temperature $t_2$ at the inlet of the variable opening expansion valve 47 are measured, respectively, by the temperature sensor 65 at the inlet of the variable compressor 37 and the temperature sensor 66 at the inlet of the variable opening expansion valve 47. The measured results are temporarily stored in the RAM 110. Now, if we denote the degrees of superheat and subcool at present stored in the ROM 112 as $\Delta t_1$ and $\Delta t_2$, respectively, these degrees of superheat and subcool can be defined by the following expressions using the data obtained above.

$$\begin{cases} \Delta t_1 = t_1 - t_{10} \\ \Delta t_2 = t_2 - t_{20} \end{cases} \quad (2)$$

If we denote an ideal degree of superheat as $\Delta t_{10}$ and an ideal degree of subcool as $\Delta t_{20}$, which are to be stored in the ROM 112, the respective deviations $x_1$ and $x_2$ of the degrees of superheat and subcool from the ideal values can be calculated by the microprocessor 103 as follows in step S15:

$$\begin{cases} x_1 = \Delta t_1 - \Delta t_{10} \\ x_2 = \Delta t_2 - \Delta t_{20} \end{cases} \quad (3)$$

The deviation of this refrigeration cycle from the ideal refrigeration cycle can be assumed sufficiently small. Therefore, the fine adjustment $\Delta y_1$ of the rotational speed of the rotary compressor 37 and the fine adjustment $\Delta y_2$ of the opening of the variable opening expansion valve 47 are defined, respectively, by the following relations with the deviation $x_1$ of degree of superheat and the deviation $x_2$ of degree of subcool in accordance with the following functional expression (4).

$$\begin{cases} \Delta y_1 = Ax_1 + Bx_2 \\ \Delta y_2 = Cx_1 + Dx_2, \end{cases} \quad (4)$$

wherein A, B, C and D are sensitivity coefficients.

The functional relation of the above expression (4) is to be determined in accordance with experiments on the actual hardware and simulations, and the sensitivity coefficients A, B, C, and D are stored in the ROM 112 in advance as functions of saturated evaporating temperature $t_{10}$ and the saturated condensing temperature $t_{20}$. Accordingly, in step S16, the fine adjustment $\Delta y_1$ of the rotational speed of the rotary compressor 37 and the fine adjustment $\Delta y_2$ of the opening of the variable opening expansion valve 47 are calculated by the microprocessor 103 according to expression (4) using the temperature deviations $x_1$ and $x_2$.

In step S17, $\Delta y_1$ and $\Delta y_2$ obtained in step S16 are converted into signals having suitable forms to be supplied to the inverter 121 and the pulse generator 122, respectively, and are applied to the inverter 121 and the pulse generator 122 via the input/output port 113. Then, in step S18, the output of the inverter 121 drives the variable induction motor 52 to finely adjust the rotational speed of the variable compressor 37, and the output of the pulse generator 122 drives the stepping motor 53 to finely adjust the opening of the variable opening expansion valve 47. These calculations and the controls can be performed, for example, every 0.5 to 1 minute, which is referred to as a Minor Cycle.

In step S14, it is decided whether the period of the closed loop control elapses or not. Step S20 is entered in case of the affirmative decision, while step S19 is repeated in case of the negative decision. In step S20, it is decided whether the time period of the open loop control elapses or not as in step S19. If the negative decision is given, the sequence returns to step S12. If the affirmative decision is given, then step S21 is entered to perform the open loop control. With regard to a Major Cycle for performing the open loop control, it is performed, for example, about every 5 minutes in order that the system is adapted to the variation of external conditions.

The water supply to the water storage tank 39 is described below. As hot water is discharged from the outlet port 41, the water head in the water storage tank 39 is lowered, so that the pressure reducing and check valve 44 is actuated to supplement tap water through the tap water inlet 43 into the tank 39. Cool water is accumulated on the bottom side of the tank 39, as hot water in the upper portion of the tank 39 flows out through the outlet port 41, so that a temperature lamination is formed in the water contained in the tank 39.

The following advantageous effects are achieved by a water heating system according to the invention, as seen from the above description.

(1) Since the rotational speed of the rotary compressor and the opening of the variable opening expansion valve are automatically controlled by the microprocessor over a wide range of operational temperature, the coefficient of performance is greatly improved in comparison with the prior art system of the same type.

(2) Since the direction of refrigerant flow is always unilateral for mild climate application compared with a heat pump air conditioning system, a four-way valve is not necessary, so that the system is simplified. The flow rates of refrigerant both on the evaporator side and the condenser side is optimized and the efficiency is higher than the heat pump air conditioning system.

(3) Since solar radiation, if available, is used as heat source, the evaporating temperature of the outdoor heat exchanger can be raised by 10° C. to 20° C. in comparison with the system using ambient air as heat source and as a result the coefficient of performance is further improved.

(4) Since the solar collector is integrated into the outdoor heat exchanger in a water heating system, the heat exchanger and the circulating pumps which have been necessary for the prior art system are not required and accordingly the structure of the system is simplified.

(5) Since Freon which has a low freezing temperature is used in the system, no risk exists that the refrigerant freezes to damage the solar collector and pipings, contrary to a prior art solar system employing water as refrigerant.

(6) Since a water heating system according to the invention uses the evaporation latent heat of its refrigerant, contrary to the use of sensible heat in a prior art solar heat pump system, the heat collecting amount per unit weight of refrigerant is considerably larger. Consequently, even with a small-sized and simple heat collector, heat can be collected with a very high efficiency.

(7) A heat collecting temperature of refrigerant in the solar collector can be considerably lowered in comparison with that of a prior art solar system, so that the heat transfer loss into ambient air is lowered, and the heat loss through pipings from the collector is also lowered.

(8) A water heating system according to the invention is of a small-size and the components of a prior art heat pump air conditioning system can be used without modification or with small modifications of the components, so that an initial investment cost can be decreased.

What is claimed is:

1. A water heating system, comprising:
    an outdoor heat exchanger including a heat collection chamber, a first heat transfer member receiving and transferring solar radiation heat, a second heat transfer member receiving and transferring the heat of ambient air, an evaporator for passing refrigerant therethrough to perform the heat exchange between said refrigerant and the heat transferred from said first and second heat transfer member, thereby evaporating said refrigerant, and said first and second heat transfer members and said evaporator being incorporated integrally in said heat collection chamber;
    a compressor of varible rotational speed connected to said outdoor heat exchanger for compressing the vaporized refrigerant from said evaporator to increase the pressure and temperature of said vaporized refrigerant;
    a water storage tank for storing water;
    a heat exchanger disposed on the bottom side in said water storage tank for passing the refrigerant vapor from said compressor and for performing the heat exchange between the water contained in said water storage tank and said refrigerant vapor to condense said refrigerant vapor;
    a variable opening expansion valve for adiabatically expanding the condensed refrigerant, thereby decreasing the pressure and temperature of said refrigerant and for supplying the refrigerant thus adiabatically expanded to said outdoor heat exchanger;
    first and second pressure measuring means for measuring the saturation vapor pressure $p_1$ and the saturation condensation pressure $p_2$ of the refrigerant passing through said outdoor heat exchanger and said heat exchanger in said water storage tank, respectively;
    first, second, third, fourth and fifth temperature measuring means for measuring the suction side temperature $t_1$ of said compressor, the inlet side temperature $t_2$ of said expansion valve, the temperature $t_3$ in said heat collection chamber, the temperature $t_4$ of the ambient air and the temperature $t_5$ of the water in said water storage tank, respectively; and
    control means for controlling the rotational speed of said compressor and the opening of said expansion valve so as to maximize or substantially maximize the coefficients of performance of the refrigeration cycle including said outdoor heat exchanger, said compressor, said heat exchanger in said water storage tank and said expansion valve, in response to the pressure and the temperature measured by said first and second pressure measuring means and said first, second, third, fourth and fifth temperature measuring means.

2. A water heating system as claimed in claim 1, wherein said controlling means comprises:
    means for determining the first temperature difference between said water temperature $t_5$ and a set temperature;
    means for determining the second temperature difference between said temperature $t_3$ in said heat collection chamber and said temperature $t_4$ of the ambient air;
    means for deciding whether an open loop control is necessary or not in accordance with said first and second temperature differences;
    means for determining the third temperature difference between said water temperature $t_5$ and said temperature $t_3$ of said heat collection chamber;
    means for determining the fourth temperature difference between said water temperature $t_5$ and said temperature $t_4$ of the ambient air;
    first memory means for storing the relations between said third and fourth temperature differences and the rotational speed $y_1$ of said compressor and the opening $y_2$ of said expansion valve, respectively; and
    means for reading out said rotational speed $y_1$ and said opening $y_2$ corresponding to said third and fourth temperature differences from said first memory means when said open loop control is necessary and for performing said open loop control of said compressor and said expansion valve by the read out rotational speed $y_1$ and the opening $y_2$, respectively.

3. A water heating system as claimed in claim 2, wherein said controlling means calculates the fine adjustment $\Delta y_1$ of the rotational speed of said compressor and the fine adjustment $\Delta y_2$ of the opening of said expansion valve in accordance with the following expression:

$$\begin{cases} \Delta y_1 = Ax_1 + Bx_2 \\ \Delta y_2 = Cx_1 + Dx_2 \end{cases}$$

wherein,
    $x_1$ and $x_2$ represent temperature deviations of degrees of superheat and subcool at present from ideal values of degrees of superheat and subcool, respectively, and
    A, B, C and D represent sensitivity coefficients determined as functions of the saturation evaporation temperature $t_{10}$ and the saturation condensation temperature $t_{20}$, said temperatures $t_{10}$ and $t_{20}$ being determined as functions of the saturation evaporation pressure $p_1$ and the saturation condensation pressure $p_2$ obtained by said first and second pressure measuring means.

4. A water heating system as claimed in claim 3, wherein said controlling means comprises:
    second memory means for storing the function between said saturation evaporation pressure $p_1$ and said saturation evaporation temperature $t_{10}$ and the function between said saturation condensation pressure $p_2$ and said saturation condensation temperature $t_{20}$, respectively;
    third memory means for storing the ideal degree of superheat $\Delta t_{10}$ and the ideal degree of subcool $\Delta t_{20}$; and
    means for calculating said temperature deviations $x_1$ and $x_2$ corresponding to the outputs read out from said second and third memory means, in accordance with the following expressions:

$$\begin{cases} x_1 = (t_1 - t_{10}) - \Delta t_{10} \\ x_2 = (t_2 - t_{20}) - \Delta t_{20} \end{cases}$$

5. A water heating system as claimed in claim 1, wherein said outdoor heat exchanger comprises means for introducing the ambient air into said heat collection chamber and said controlling means controls said introducing means in response to the fifth temperature difference between the temperature $t_3$ in said heat collection chamber and the temperature $t_4$ of the ambient air, to supply the ambient air to said heat collection chamber when said fifth temperature difference is lower than a predetermined value and this state continues for a predetermined period of time, and not to supply the ambient air to said heat collection chamber when said fifth temperature difference is higher than said predetermined value and this state continues for said predetermined period of time but to supply only the solar radiation heat collected by said first heat transfer member to said heat collection chamber.

6. A water heating system as claimed in claim 1, wherein said controlling means for determining a period of time during which said refrigeration cycle is enabled.

7. A water heating system as claimed in claim 6, wherein said period of time is a predetermined time period of daytime.

8. A water heating system, comprising:
- an outdoor heat exchanger including a heat collection chamber, a first heat transfer member receiving and transferring solar radiation heat, a second heat transfer member receiving and transferring the heat of ambient air, an evaporator for passing refrigerant therethrough to perform the heat exchange between said refrigerant and the heat transferred from said first and second heat transfer members, thereby evaporating said refrigerant, and said first and second heat transfer members and said evaporator being incorporated integrally in said heat collection chamber;
- a compressor of variable rotational speed connected to said outdoor heat exchanger for compressing the vaporized refrigerant from said evaporator to increase the pressure and temperature of said vaporized refrigerant;
- a water storage tank for storing water;
- a heat exchanger disposed on the bottom side in said water storage tank for passing the refrigerant vapor from said compressor and for performing the heat exchange between the water contained in said water storage tank and said refrigerant vapor to condense said refrigerant vapor;
- a variable opening expansion valve for adiabatically expanding the condensed refrigerant, thereby decreasing the pressure and temperature of said refrigerant and for supplying the refrigerant thus adiabatically expanded to said outdoor heat exchanger;
- first, second, third, fourth, fifth, sixth and seventh temperature measuring means for measuring the suction side temperature $t_1$ of said compressor, the inlet side temperature $t_2$ of said expansion valve, the temperature $t_3$ in said heat collection chamber, the temperature $t_4$ of the ambient air, the temperature $t_5$ of the water in said water storage tank, the temperature $t_6$ in said evaporator and the temperature $t_7$ in said heat exchanger in said water storage tank, respectively,
- control means for controlling the rotational speed of said compressor and the opening of said expansion valve so as to maximize or substantially maximize the coefficients of performance of the refrigeration cycle including said outdoor heat exchanger, said compressor, said heat exchanger in said water storage tank and said expansion valve, in response to the temperature measured by said first, second, third, fourth, fifth, sixth and seventh temperature measuring means.

9. A water heating system as claimed in claim 8, wherein said controlling means comprises:
- means for determining the first temperature difference between said water temperature $t_5$ and a set temperature;
- means for determining the second temperature difference between said temperature $t_3$ in said heat collection chamber and said temperature $t_4$ of the ambient air;
- means for deciding whether an open loop control is necessary or not in accordance with said first and second temperature differences;
- means for determining the third temperature difference between said water temperature $t_5$ and said temperature $t_3$ of said heat collection chamber;
- means for determining the fourth temperature difference between said water temperature $t_5$ and said temperature $t_4$ of the ambient air;
- fourth memory means for storing the relations between said third and fourth temperature differences and the rotational speed $y_1$ of said compressor and the opening $y_2$ of said expansion valve, respectively; and
- means for reading out said rotational speed $y_1$ and said opening $y_2$ corresponding to said third and fourth temperature differences from said fourth memory means when said open loop control is necessary and for performing said open loop control of said compressor and said expansion valve by the read out rotational speed $y_1$ and the opening $y_2$, respectively.

10. A water heating system as claimed in claim 9, wherein said controlling means calculates the fine adjustment $\Delta y_1$ of the rotational speed of said compressor and the fine adjustment $\Delta y_2$ of the opening of said expansion valve in accordance with the following expression:

$$\begin{cases} \Delta y_1 = Ax_1 + Bx_2 \\ \Delta y_2 = Cx_1 + Dx_2 \end{cases}$$

wherein,
- $x_1$ and $x_2$ represent temperature deviations of degrees of superheat and subcool at present from ideal valued of degrees of superheat and subcool, respectively, and
- A, B, C and D represent sensitivity coefficients determined as functions of the saturation evaporation temperature $t_{10}$ and the saturation condensation temperature $t_{20}$, obtained by said fifth and sixth temperature measuring means.

11. A water heating system as claimed in claim 10, wherein said controlling means comprises:
fifth memory means for storing the ideal degree of superheat $\Delta t_{10}$ and the ideal degree of subcool $\Delta t_{20}$; and
means for calculating said temperature deviations $x_1$ and $x_2$ corresponding to the outputs read out from said fifth memory means, in accordance with the following expressions:

$$\begin{cases} x_1 = (t_1 - t_{10}) - \Delta t_{10} \\ x_2 = (t_2 - t_{20}) - \Delta t_{20}. \end{cases}$$

12. A water heating sytem as claimed in claim 8, wherein said outdoor heat exchanger comprises means for introducing the ambient air into said heat collection chamber and said controlling means controls said introducing means in response to the fifth temperature difference between the temperature $t_3$ in said heat collection chamber and the temperature $t_4$ of the ambient air, to supply the ambient air to said heat collection chamber when said fifth temperature difference is lower than a predetermined value and this state continues for a predetermined period of time, and not to supply the ambient air to said heat collection chamber when said fifth temperature difference is higher than said predetermined value and this state continues for said predetermined period of time but to supply only the solar radiation heat collected by said first heat transfer member to said heat collection chamber.

13. A water heating system as claimed in claim 8, wherein said controlling means comprises means for determining a period of time during which said refrigeration cycle is enabled.

14. A water heating system as claimed in claim 13, wherein said period of time is a predetermined time period of daytime.

* * * * *